3 Sheets Sheet 1

N. Platt,
Mower.

No. 392

Reissued Aug. 31. 1858

3 Sheets. Shed 2.

N. Platt,

Mower.

No. 592. Reissued. Aug. 31, 1858.

3 Sheets. Sheet 3.

N. Platt,

Mower.

No. 592. Reissued Aug. 31 1858.

UNITED STATES PATENT OFFICE.

W. H. SEYMOUR AND D. S. MORGAN, OF BROCKPORT, NEW YORK, ASSIGNEES OF N. PLATT.

IMPROVEMENT IN HARVESTERS.

Specification forming part of Letters Patent No. 6,517, dated June 12, 1849; Reissue No. 265, dated May 23, 1854; Reissue No. 592, dated August 31, 1858.

DIVISION C.

*To all whom it may concern:*

Be it known that NELSON PLATT, formerly of Ottawa, in the county of La Salle and State of Illinois, late of Kendall county, in the same State, (assignor to WILLIAM H. SEYMOUR and DAYTON S. MORGAN, of Brockport, in the county of Monroe and State of New York,) did invent a new and useful Improvement in Machines for Cutting and Raking Grain or Grass, of which the following is a full, clear, and exact description, reference being had to the accompanying drawings, which make part of this specification, and in which—

Figure 1:
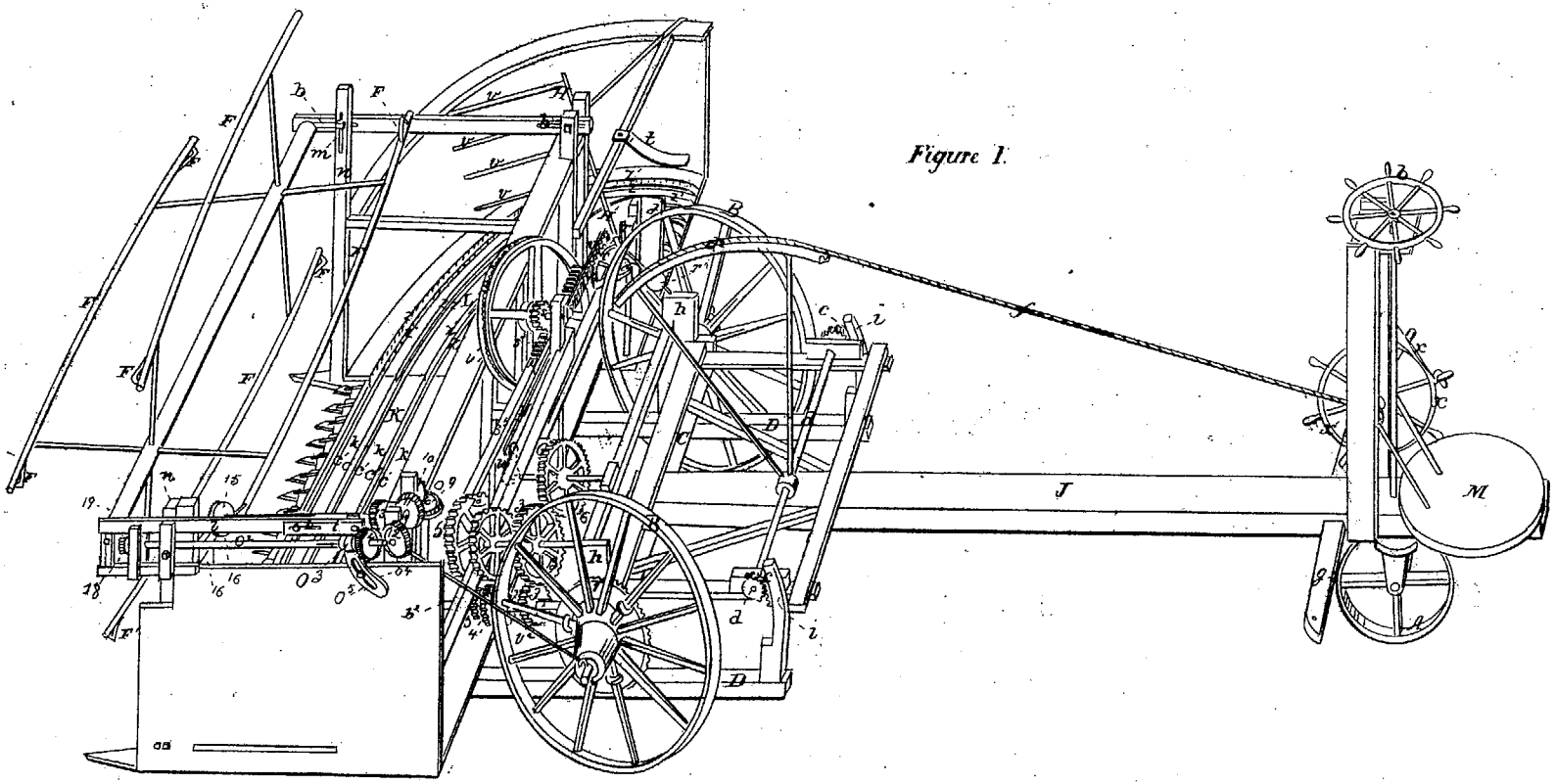
Figure 2:
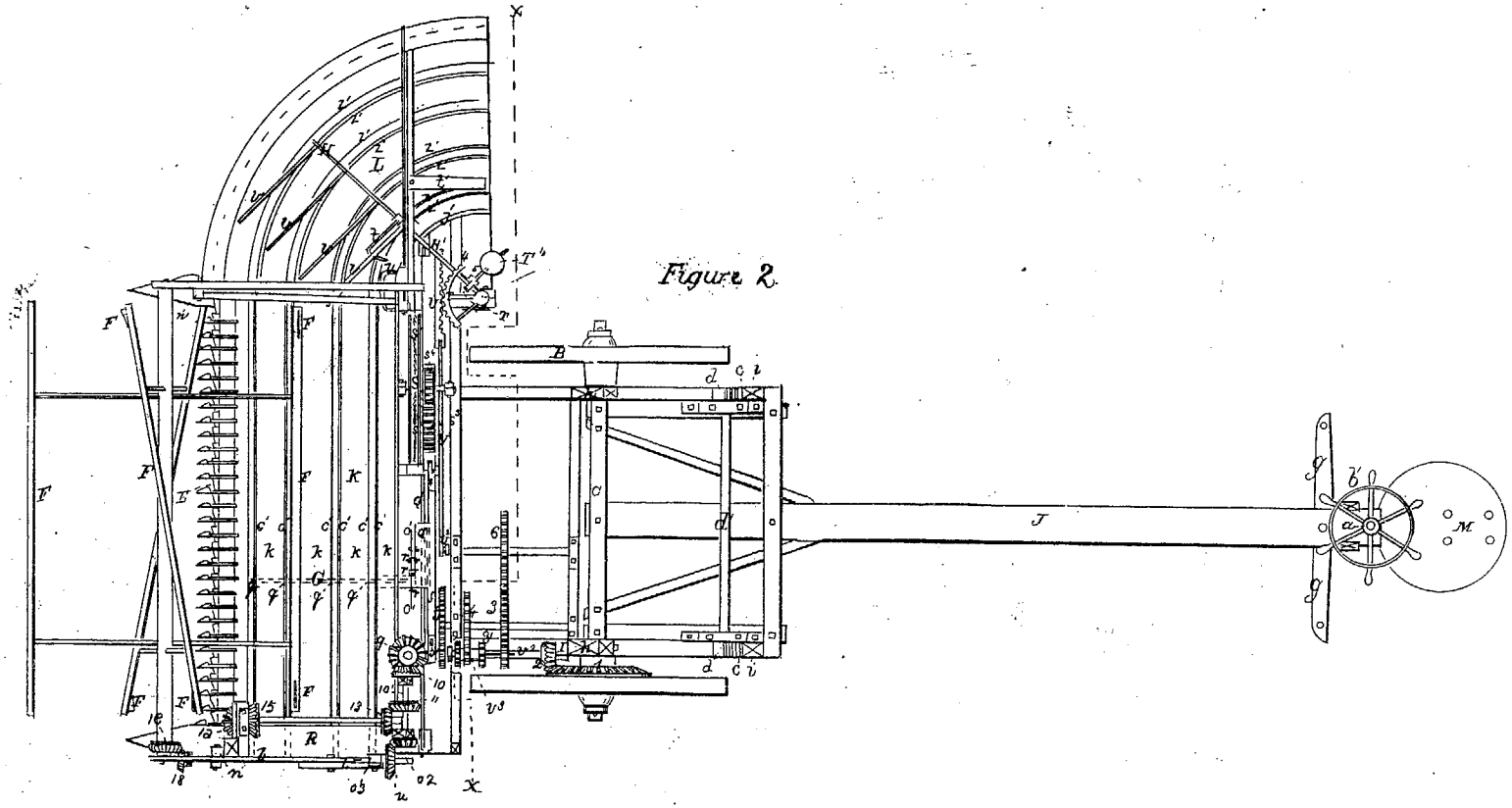
Figure 1:
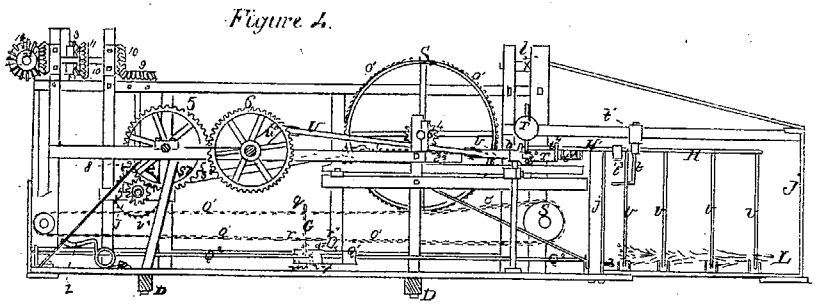
Figure 3:
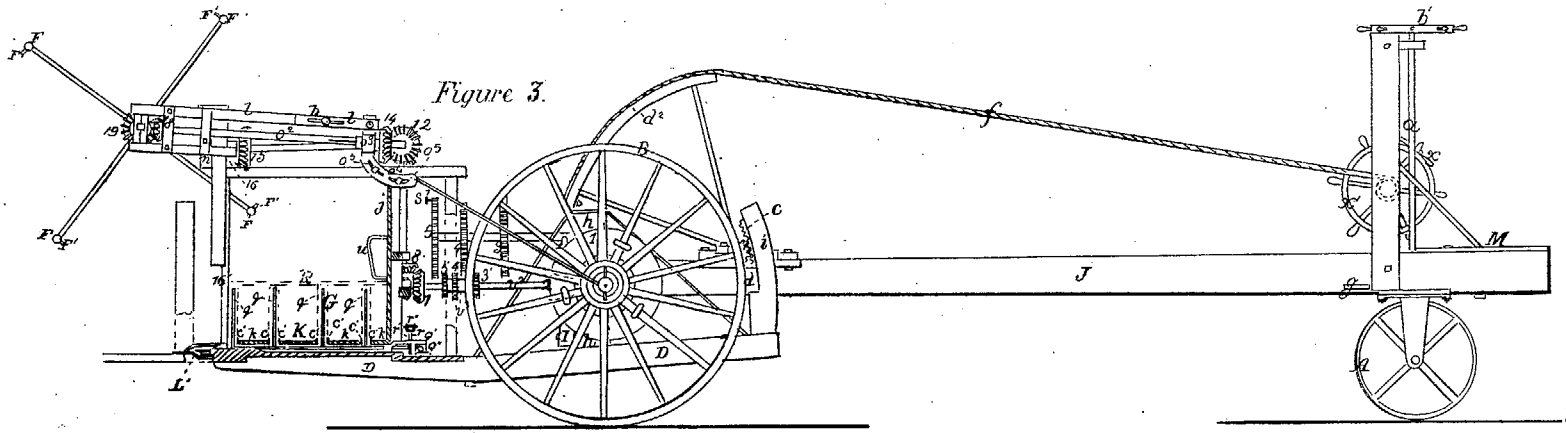
Figure 10:
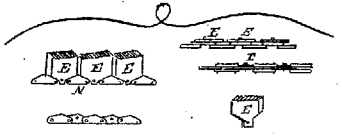

Figure 1 represents a view in perspective, and Fig. 2 a plan or top view, of a machine embracing the said improvement. Fig. 3 represents an elevation of that side of the machine which runs next to the uncut grain, a portion of the frame being removed to expose a part of the raking mechanism and cutting apparatus; and Fig. 4 represents an elevation (seen from the rear) of that part of the machine which is in front of a vertical plane shown by the dotted line *x x* of Fig. 2.

The said improvement relates to that part of the platform of the reaping-machine which is traversed by a rake working above the platform and discharging the grain upon the ground, the object of this improvement being to facilitate the passage of the grain over said platform.

The drawings represent a complete machine for cutting and raking grain; but those parts only need be particularly described in this specification which embrace the improvement claimed under this patent.

In this machine two kinds of rake are shown. One of these rakes, for the sake of compactness of arrangement, is made to work below the grain, and to accommodate its head this part of the platform is made double, with slots in the upper floor, through which the teeth may rise at suitable intervals and seize the grain; but the grain is liable to become entangled in these slots and even to be carried into the space in which the rake-head works, causing clogging of the apparatus.

To obviate these difficulties where such compactness is not required, the other rake, which works wholly above the platform, is used; and the object of the invention claimed under this patent is the improvement of that part of the platforms traversed by the rake working in this manner.

When a rake moving above a smooth platform is employed there is a risk of its overriding the grain, or, if it is held down to its work, of rubbing along the track of the points of the teeth, and even then slight inequalities may cause some of the teeth to override the grain and become entangled therewith. The present improvement obviates this difficulty by causing the points of the teeth to pass below the plane traversed by the grain, and yet by reason of this portion of the platform being made solid there is no danger of the entanglement of the grain, as in a platform of slats, while at the same time the moving grain encounters less resistance from friction. The part of the platform L in question has a solid floor, upon the surface of which are placed narrow ribs or strips *z'*, which rise to such a height that when the teeth *v* of the rake H are at work the grain shall be supported high enough above their points to avoid any risk of being overridden. To avoid increasing the height of the ribs or strips, depressions are made beneath the path of the teeth, by which the same end is attained. The ribs in this instance are made of sheet metal. Their direction should as nearly as possible coincide with the path pursued by the teeth of the rake, and their number, to obtain the best effect, should be at least one for each tooth of the rake; but there may be two for each tooth, as shown in the drawings. By this construction of a ribbed solid platform there is no space left for the grain to get into and become entangled, and the teeth of the rake passing below the plane traversed by the grain will not allow any of the grain to escape as the rake moves over the platform, and at the same time the narrow ribs cause the grain to move with less friction, as it is kept above any inequalities on the intervening surfaces.

The drawings show an automatic rake, which is more fully described in the specification of another patent issued to us simultaneously with this. In this case the rake, while drawing the grain, is held firmly down to its work. Hence it is highly important, if not indispensable, that the points of its teeth should not come in contact with the floor.

We do not intend to claim any arrangement of the platforms herein described, or either of them, as the invention relates solely to the construction of the platform.

What is claimed under this patent as the invention of the said NELSON PLATT is—

Constructing that portion of the platform of the reaping-machine which is traversed by a rake working above it with a solid floor so shaped as to allow the points of the teeth of the rake to move below the plane traversed by the grain, substantially as herein set forth.

In testimony whereof we have hereunto subscribed our names.

WM. H. SEYMOUR.
D. S. MORGAN.

In presence of—
GEO. H. ALLEN,
JAMES ROBY.